United States Patent [19]

Choi

[11] Patent Number: 5,769,179
[45] Date of Patent: Jun. 23, 1998

[54] POWER STEERING SYSTEM AND METHOD FOR A VEHICLE

[75] Inventor: Myung-Sik Choi, Kyungnam-Do, Rep. of Korea

[73] Assignee: Hyundai Motor Company, Ltd., Seoul, Rep. of Korea

[21] Appl. No.: 672,567

[22] Filed: Jun. 28, 1996

[30] Foreign Application Priority Data

Jun. 28, 1995 [KR] Rep. of Korea ...................... 95-17703

[51] Int. Cl.$^6$ ....................................................... B62D 5/06
[52] U.S. Cl. .......................................................... 180/414
[58] Field of Search .................................... 180/400, 403, 180/408, 412, 414, 415, 416, 417, 422, 423, 443, 444, 447

[56] References Cited

U.S. PATENT DOCUMENTS 5,326,057  7/1994  Takehara et al. ....................... 180/414
5,351,777  10/1994  Fujio et al. .............................. 180/414

Primary Examiner—Stephen Avila

[57] ABSTRACT

A power steering system for a vehicle having a gear box and an intermediate shaft connected thereto, includes first and second sensors for detecting a speed of the vehicle and a pressure within a cylinder connected to the gear box, and a limiting mechanism for limiting the steering force of the vehicle according to the detection by the first and second sensors.

20 Claims, 3 Drawing Sheets

POWER STEERING SYSTEM AND METHOD FOR A VEHICLE

BACKGROUND OF THE INVENTION

1. Field of the Invention

The present invention relates to an improved power steering system for a vehicle and more particularly, to a power steering system for controlling steering force in high speeds so as to prevent traffic accidents.

2. Description of Related Art

Various types of power steering systems for a vehicle are known in the art. Generally, a steering system is very important in safely changing the direction of a vehicle. As shown in FIG. 1, a conventional power steering system includes an operating section for delivering a steering force to a steering gear box 50, a gearing section for increasing the steering force by applying a hydraulic pressure and simultaneously delivering the steering force to links 65 and tires 60 after changing the driving direction of the operating section, and a linking section for operating the tires 60 after receiving the steering force from the gearing section.

The operating section includes a steering wheel, a handle 10, a steering shaft and column 20, a direction changing gear 30, and an intermediate shaft 40. The gearing section includes the steering gear box 50 and the linking section includes the tires 60 and the connecting links 65.

Such conventional power steering systems are easily steered and greatly reduce steering force compared to conventional manual steering systems so that the conventional power systems are used in medium or large vehicles. However, in high speeds, such conventional power systems suffer from a number of problems. For example, a vehicle with such a conventional power system responds too quickly to a small steering power applied by the driver such that in high speeds, the vehicle turns too quickly and too much even though the driver turned the handle only little bit.

SUMMARY OF THE INVENTION

Accordingly, it is an object of the present invention to provide an improved power steering system for a vehicle, which eliminates the above problems encountered with conventional power steering systems.

Another object of the present invention is to provide a power steering system having a steering force controlling function by maintaining a certain steering force in high vehicle speeds and reducing a traction between the tires and the road surface.

A further object of the present invention is to provide a power steering system which includes a direction changing gear for changing the operation direction of the steering wheel, an intermediate shaft for delivering the operation power from the direction changing gear to a gear box, shaft abrasives for operatively surrounding the left and right outer sides of the intermediate shaft, fixed and operating arms connected to the abrasives, a return spring disposed in the lower portion of the fixed and operating arms for elastically moving the operating arm, a controlling cylinder connected to a push rod at the upper portion of the fixed and operating arms, a controlling valve member for controlling the flow of oil into the cylinder, a pressure flow sensor for sensing the hydraulic flow pressure of the controlling cylinder, a vehicle speed sensor for sensing the speed of the vehicle, and a controller for controlling the oil flow based on output signals from the pressure sensor and vehicle sensor.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a power steering system for a vehicle having a gear box and an intermediate shaft connected thereto, including sensor means for detecting a speed of the vehicle and a pressure within a cylinder, and limiting means for limiting steering force of the vehicle according to the detection by the sensor means.

Furthermore, the present invention is directed to a method of power steering a vehicle having a gear box and an intermediate shaft connected thereto, including the steps of detecting a speed of the vehicle and a pressure within a cylinder, and limiting the steering force of the vehicle according to the detection.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
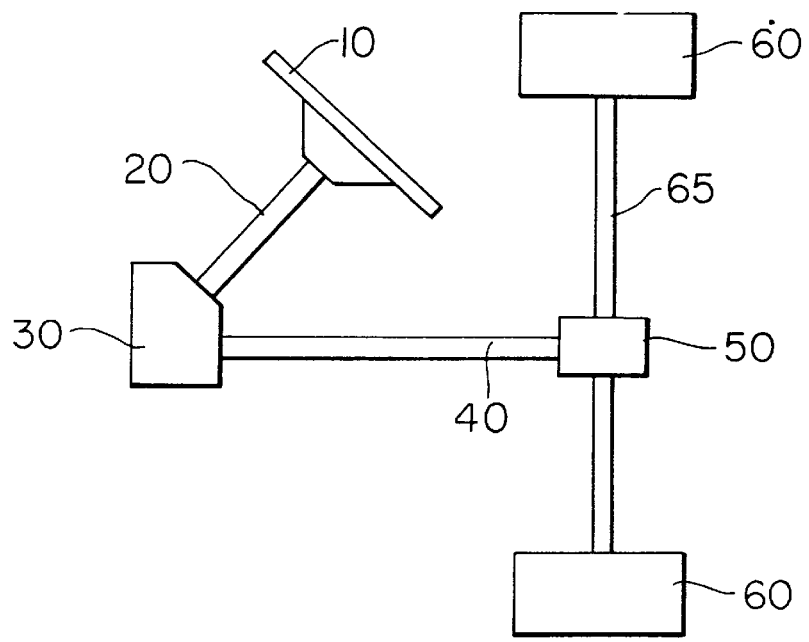
FIG. 1 is a partially diagrammed sectional view of a conventional power steering system.
Figure 2:
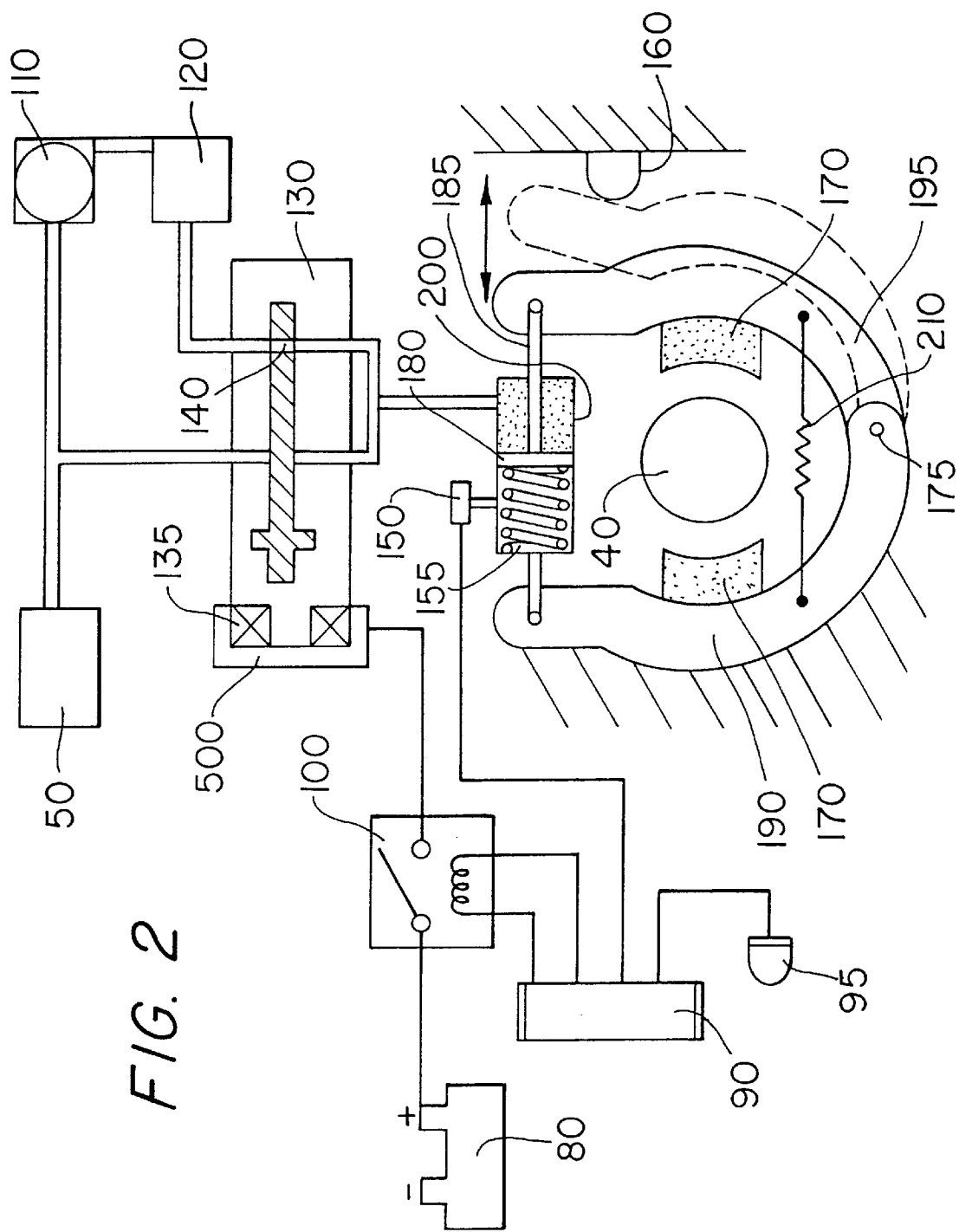
FIG. 2 is a partially diagrammed sectional view of a power steering system according to the embodiments of the present invention.

Referring now in detail to the drawings for the purpose of illustrating preferred embodiments of the present invention, the improved power steering system as shown in FIGS. 1 and 2, for example, includes a direction changing gear 30 for changing the operation direction of a steering wheel 10, an intermediate shaft 40 for delivering the operation power from the direction changing gear 30 to a gear box 50, a fixed arm 190 and an operating arm 195 each having an abrasive 170 for operatively contacting the left and right outer sides of the intermediate shaft 40, and a return spring 210 connected to the fixed arm 190 and operating arm 195 for elastically moving the operating arm 195 to its original position. Here, the operating arm 195 is connected to the fixed arm 190 through a hinge 175.

The power steering system of the present invention further includes a push rod 185 connected to the upper portions of the fixed and operating arms 190 and 195, a controlling cylinder 200 containing the push rod 185 and a spring 155 for generating controlling power using a hydraulic pressure from an oil pump 110, a controlling valve member 130 for controlling the flow of hydraulic pressure to the controlling cylinder 200, a pressure flow sensor 150 for sensing the flow of hydraulic pressure to the controlling cylinder 200, a speed sensor 95 for sensing the speed of the vehicle, and a controller 90 for controlling the controlling valve member 130 upon receipt of signals from the pressure and speed sensors 150 and 95.

The controlling valve member 130 includes an electromagnet 135 actuated by a solenoid valve 500 and connected to a relay 100 having an ON/OFF switch, which is controlled by the controller 90. If the switch is ON, the electromagnet 135 is magnetized and pulls a spool 140 to turn on a solenoid valve 120 so as to allow oil from the steering gear box 50 to flow to the controlling cylinder 200.

Figure 3A:
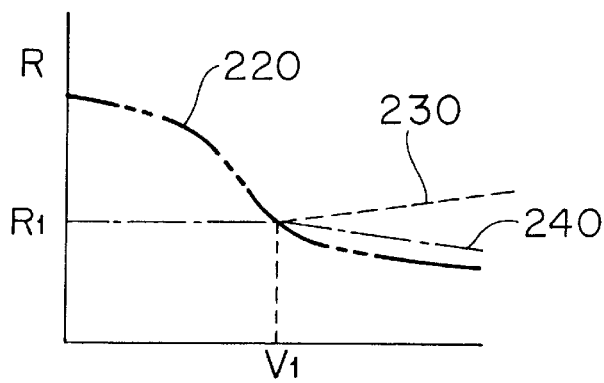
FIG. 3(A) is a graph of a steering force (R) v. a speed (V) of a vehicle according to the embodiments of the present invention.
Figure 3B:
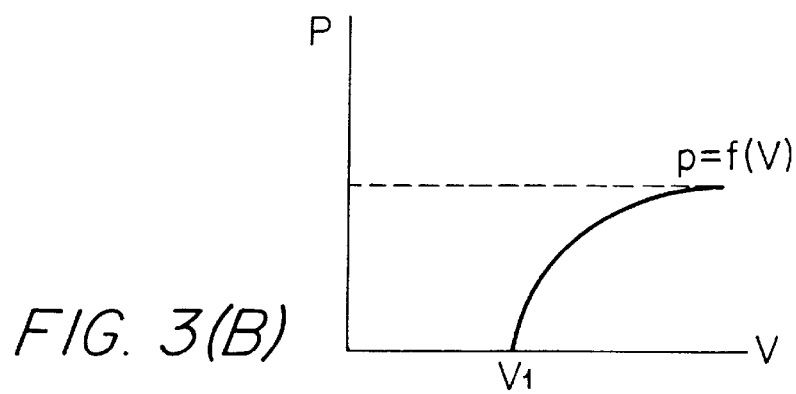
FIG. 3(B) is a graph of a controlling pressure (P) v. a speed (V) of a vehicle according to the embodiments of the present invention.
Figure 4:
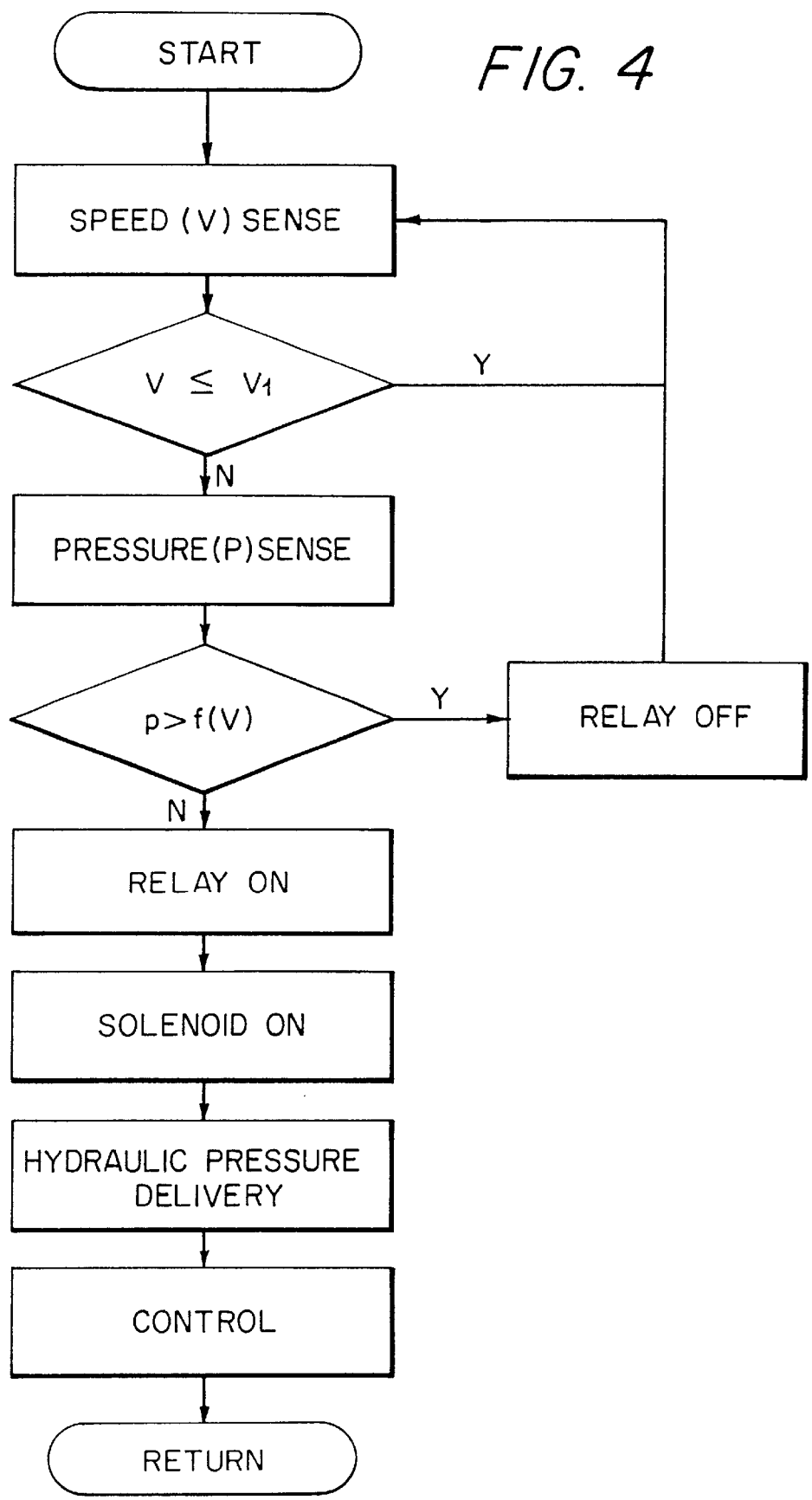
FIG. 4 is a flow chart for explaining an operation of the power steering system having the steering force controlling function according to the embodiments of the present invention.

As shown in FIGS. 3(A), 3(B), and 4, the power steering system according to the embodiments of the present invention operates as follows.

The controller 90 receives a detection signal from the speed sensor 95 which senses an increase/decrease in the vehicle speed, and compares the running vehicle speed (V) with a constant vehicle speed (VI). At this time, if the running vehicle speed (V) is greater than the constant vehicle speed (V1), the controller 90 checks the pressure using the pressure flow sensor 150 for sensing the hydraulic pressure of the controlling cylinder 200.

At this time, if the detected pressure is greater than a function of the running speed, the controller 90 turns ON the relay 100 for supplying electricity from an electric source 80 to the electromagnet 135. This magnetizes the electromagnet 135 which pulls the spool 140 such that the solenoid valve 500 is placed in the ON position and the oil flows to the controlling cylinder 200 from the steering gear box 50.

Thereafter, the oil in the controlling cylinder 200 generates a hydraulic flow pressure and a piston 180 within the cylinder 200 moves one end of the push rod 185 toward the spring 155. As a result, the top end portion of the operating arm 195 is moved toward the fixed arm 190, so that the pair of abrasives 170 tightly contact and control the intermediate shaft 40.

If the speed of the vehicle is decreasing, the controller 90 turns OFF the relay 100 according to the speed sensor 95. This deactivates the electromagnet 135 and turns OFF the solenoid valve 500 so that the oil flows to an oil reservoir 120 from the controlling cylinder 200. Consequently, the hydraulic pressure disappears from the controlling cylinder 200. At this time, due to the biasing force of the return spring 210, the fixed and operating arms 190 and 195 are separated from the adhesives 170 and the intermediate shaft 40. Here, a stopper 160 is provided to limit the movement of the operating arm 195. Accordingly, the controller 90 controls the steering force of the vehicle according to the vehicle speed.

As shown in FIG. 3(A), the steering force (R) of a conventional manual steering system as shown in a bold dotted line 220 and the steering force (R₁) of a conventional power steering system as shown in a thin dotted line 240 decrease as the vehicle speed increases. In contrast, the power steering system of the present invention increases as the vehicle speed increases as indicated by a thin dotted line 230.

Additionally, as shown in FIG. 3(B), since the pressure (P) in the controlling cylinder 200 has a close relationship with the vehicle speed (V), the power steering system of the present invention regulates based on the vehicle speed, a steering force being applied to an intermediate shaft so as to prevent over steering in high speeds and occurrence of traffic accidents.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power steering system for a vehicle having a gear box and an intermediate shaft connected thereto, comprising:
   sensor means for detecting a speed of the vehicle and a pressure within a cylinder connected to the gear box; and
   limiting means for limiting steering force of the vehicle according to the detection by the sensor means,
   wherein the limiting means includes,
       valve means for controlling a flow of an oil from the gear box to the cylinder,
       arm means for movably surrounding the intermediate shaft, and
       cylinder means including the cylinder for moving the arm means.

2. A system of claim 1, wherein the limiting means includes:
   control means for activating the valve means according to the detection by the sensor means so as to limit the steering force of the vehicle.

3. A system of claim 1, wherein the arm means includes:
   a first arm fixed to the cylinder means,
   a second arm connected to the cylinder means and being movable with respect to the intermediate shaft, and
   a plurality of abrasives connected to the first and second arms for contacting the intermediate shaft.

4. A system of claim 3, wherein the arm means further includes:
   an elastic member connected to lower portions of the first and second arms so as to elastically move the second arm to and from the intermediate shaft.

5. A system of claim 3, wherein the cylinder means includes:
   the cylinder for receiving the oil from the gear box,
   a piston and a spring disposed within the cylinder, and
   a rod connecting the cylinder and the first and second arms for elastically moving the piston and the second arm away from the intermediate shaft when the oil is received into the cylinder.

6. A system of claim 1, wherein the valve means includes:
   a solenoid valve for controlling the flow of the oil, and
   a controlling valve member for selectively transferring the oil from the gear box to the cylinder means.

7. A system of claim 6, wherein the arm means includes:
   a first arm fixed to the cylinder means,
   a second arm connected to the cylinder means and being movable with respect to the intermediate shaft, and
   a plurality of abrasives connected to the firs and second arms for contacting the intermediate shaft.

8. A system of claim 6, wherein the controlling valve member includes:
   an electromagnet being selectively activated by the control means, and
   a spool for moving in cooperation with the electromagnet.

9. A system of claim 8, wherein the control means includes:
   a control unit for receiving detection signals from the sensor means and generating a control signal according the detection signals, and a relay for selectively supplying power to the electromagnet according to the control signal from the control unit.

10. A system of claim 2, wherein when the sensor means detects a predetermined speed and pressure, the control means activates the valve means so as to allow the oil from the gear box to flow to the cylinder and cause the arm means to move closer to the intermediate shaft, for controlling the steering force of the vehicle.

11. A system of claim 10, wherein the arm means includes:

a first arm fixed to the cylinder means, a second arm connected to the cylinder means and being movable with respect to the intermediate shaft, and a plurality of abrasives connected to the first and second arms for contacting the intermediate shaft.

12. A system of claim 3, further comprising:

a stopper for limiting a movement of the second arm.

13. A system of clam 3, wherein lower and upper portions of the first and second arms are elastically connected to each other.

14. A method of power steering a vehicle having a gear box and an intermediate shaft connected thereto, comprising the steps of:

detecting a speed of the vehicle and a pressure within a cylinder connected to the gear box; and limiting steering force of the vehicle according to the detection, wherein the limiting step includes the steps of, controlling a flow of an oil from the gear box to the cylinder, providing a fixed arm and an operating arm connected to the cylinder, and moving the operating arm by receiving the oil into the cylinder.

15. A method of claim 14, wherein the limiting step includes the step of:

activating a valve member according to the detection in the detection step to control the flow of the oil so as to limit the steering force of the vehicle.

16. A method of claim 14, wherein the providing step includes the step of:

supplying the fixed and operating arms with a plurality of abrasives for contacting the intermediate shaft.

17. A method of claim 14, wherein the providing step includes the step of:

connecting lower portions of the fixed and operating arms with an elastic member so as to elastically move the operating arm to and from the intermediate shaft.

18. A method of claim 15, wherein the activating step includes the steps of:

providing the cylinder for receiving the oil from the gear box, providing a piston and a spring disposed within the cylinder, and providing a rod connecting the cylinder and the fixed and operating arms for elastically moving the piston and the operating arm away from the intermediate shaft when the oil is received into the cylinder.

19. A method of claim 15, wherein the activating step includes the step of:

selectively activating an electromagnet so as to selectively operate the valve member.

20. A method of claim 15, wherein when a predetermined speed and pressure are detected in the detecting step, the valve member is activated so as to allow the oil from the gear box to flow to the cylinder and cause the operating arm to move closer to the intermediate shaft, for limiting the steering force of the vehicle.

* * * * *